United States Patent [19]

Bishop

[11] 3,977,001
[45] Aug. 24, 1976

[54] FRIEND-ACCEPT DECIDER TEST SIMULATOR

[75] Inventor: Walton B. Bishop, Oxon Hill, Md.

[73] Assignee: The United States of America as represented by the Secretary of the Navy, Washington, D.C.

[22] Filed: May 23, 1975

[21] Appl. No.: 580,431

[52] U.S. Cl. .............................................. 343/17.7
[51] Int. Cl.² ............................................ G01S 7/40
[58] Field of Search .................................. 343/17.7

[56] References Cited
UNITED STATES PATENTS 3,794,999  2/1974  Gellekink ............................ 343/17.7
3,800,440  4/1974  Membrino et al. ............. 343/17.7 X Primary Examiner—T.H. Tubbesing
Attorney, Agent, or Firm—R. S. Sciascia; Philip Schneider; Norman Brown

[57] ABSTRACT

A technique for testing decision-making devices of the Yes-No, or friend accept type in order to determine their operating performance characteristics. Binary information having predetermined characteristics is applied to a device under test, and response by the device observed.

10 Claims, 1 Drawing Figure

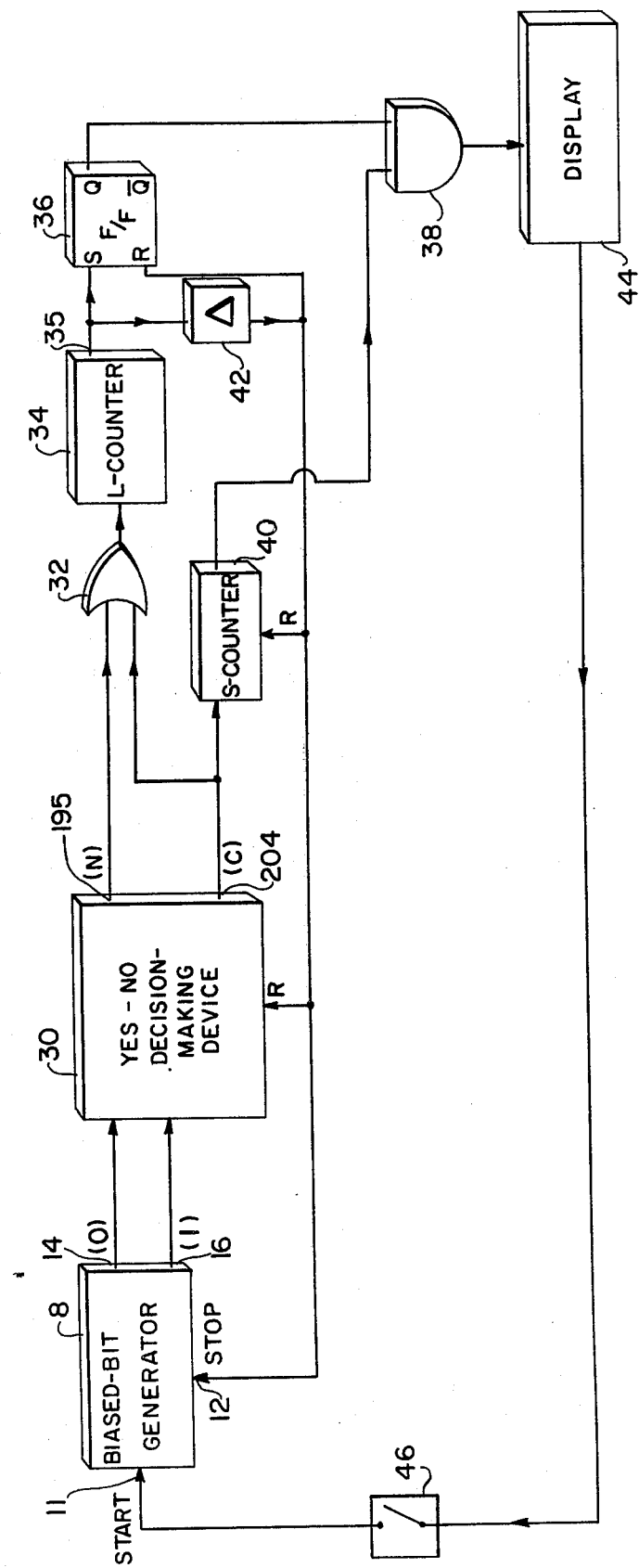

FRIEND-ACCEPT DECIDER TEST SIMULATOR

CROSS-REFERENCE TO RELATED APPLICATION

The present invention is related to copending Application Ser. No. 561,966 of Walton B. Bishop and John M. Hovey, entitled Biased Bit Generator, filed Mar. 25, 1975, and assigned to the assignee of the present invention.

BACKGROUND OF THE INVENTION

The present invention relates to systems for testing decision-making devices, and more particularly to systems for testing decision making devices-making Yes-No type decisions based on binary information samples.

Prior testing to determine how well Yes-No type, or friend-accept type decision-making devices perform require either in-situ flight testing in the signal environment, or require recording signals during an actual flight in the signal environment, and then playing back the signals in a laboratory test procedure. Expense, reliability, and other disadvantages of video recording and play-back as described obviously aggravate the already inherently cumbersome, expensive, time-consuming, and generally undesirable flight testing procedures.

Mathematical estimations of the capabilities of Yes-No type of friend-accept type decision devices are often employed in lieu of actual testing procedures, although these estimations are often of limited utility, rather inconclusive, and unconvincing.

SUMMARY OF THE INVENTION

The present invention is a technique which applies binary information having predetermined characteristics to a decision-making device under test, and observes the performance of the device in response to the applied information. The applied binary information is representative of "friend" replies and "non-friend" replies expected in any signal environment desired to be simulated.

It is therefore an object of the present invention to test the performance characteristics of decision devices whose input information is binary in character.

It is another object of the present invention to apply binary information having predetermined desired characteristics to a decision device under test and to observe the response of the device to the applied information.

Other objects, advantages and novel features of the invention will become apparent from the following detailed description of the invention when considered in conjunction with the accompanying drawings wherein:

DESCRIPTION OF THE DRAWING

The single FIGURE depicts, in schematic block diagram fashion, the described embodiment of the present invention.

DETAILED DESCRIPTION

The capability of Yes-No type devices utilizing input information of binary nature to make approprate decisions can be determined experimentally by recording the percentage of correct decisions made when large numbers of input-signals having predetermined characteristics are provided to the device under test. The FIGURE shows an implementation of the technique of the present invention wherein the number of Accept decisions made by such a device in L tries, when the probability that any particular reply (selected at random) will be a good one is equal to P, has any desired value.

A biased bit generator 8, disclosed in the above-referenced application, has a start terminal 11, a stop terminal 12, a binary "0" output-terminal 14 and a binary "1" output-terminal 16. Binary output-terminals 14, 16 are connected to corresponding input-terminals of a decision-making device 30 under test. Device 30 has a reset-terminal R, a decision-signal output-terminal 195 for a "Non-Accept" decision-signal N, and output-terminal 204 for an "Accept" decision-signal C. An OR gate 32 has input-terminals connected to both signal output-terminals 195, 204. The output-terminal of OR 32 is connected to the input terminal of an L-counter 34, whose output-terminal 35 is in turn coupled to the set-terminal S of a set-reset flip-flop device 36. Flip-flop 36 also has a reset-terminal R.

The non-complementary output-terminal Q of flip-flop 36 is coupled to an input-terminal of an AND device 38.

An S-counter 40 has an input-terminal connected to C signal output-terminal 204, and has an output-terminal coupled to the other input of AND 38. S-counter 40 also has a reset-terminal R.

A delay device 42 has an input-terminal coupled to L-counter output-terminal 35, and has an output-terminal coupled to stop terminal 12, and to all reset terminals R (i.e., to device 30, flip-flop 36, and counter 40).

The output-terminal of AND 38 is coupled to an input of a display means 44, such as a printer or an electronic display, having an output-terminal coupled through a switch 46 to start terminal 11.

Biased Bit Generator 8 is fully described in the above referenced copending application of Walton Bishop and John L. Hovey and will not be discussed in great detail herein. Generally, however, the Biased Bit Generator generates binary "0"s and "1"s at its output-terminals 14, 16 respectively, wherein the ratio of 1's and 0's is in accordance with a preset selected value P. While not shown in the schematic diagram of FIG. 1 of Bishop et al, the embodiment of the present invention requires clock 26 of frequency generator 100 thereof to have a "stop terminal" 12, as shown herein.

The preferred embodiment of the invention disclosed above will be described with reference to testing of an Identification-friend-or-foe (IFF) decision device wherein a "1" input signal pulse on terminal 16 represents a "good" or "friendly" reply, and an input signal pulse on the "0" input-lead from terminal 14 represents a "bad" or "incorrect" reply, or no reply at all to an interrogation. Tests of decision-making devices utilized in other applications would of course use the input 1's and 0's to represent other appropriate meanings derived from the associated application.

Biased Bit Generator 8 provides binary 1's and 0's as input signals to the decision device 30, under test when switch 46 is shut.

Decision device 30 under test will, thereafter, based upon its decisional criteria and applied binary input data-information thereof, generate a "Yes" or "No" decision signal at terminals 204, 195, respectively. For example, if in testing an IFF decision device 30, Biased Bit Generator 8 is set to produce 70% or more 1's than 0's, then the input to device 30 will correspond to inputs that the device might receive while a interrogator-respondor's antenna is aimed toward a friendly transponder. In this case, the decision device is expected to make an "Accept" (i.e., "Yes") decision and produce a signal C pulse on output-terminal 204 after no more than $n$ inputs from the Biased Bit Generator 8 have been provided. In this IFF example, it is further assumed that device 30 will provide an output pulse signal N (i.e., a "No" decision) at output-terminal 195 after $n$ input signals to the device are received, if no "Accept" decision is made before then.

Both output signals N, C, from device 30 go through OR 32 to L-counter 34. This counter counts the total number of decisions made by the device 30 under test. S-counter 40 counts only the number of "Yes" decisions. Continuing with the IFF decision device example, when an IFF decision device 30 makes an "AC-CEPT" (or "Yes") decision before $n$ input pulses from Biased Bit Generator 8 have been received, an "AC-CEPT" signal C at terminal 204 is applied to S-counter 40, which counts the number of "ACCEPT" or "Yes" decisions made by device 30.

Since Biased Bit Generator 8 will produce biased bits indefinitely if allowed to do so, the process of applying a test signal and counting successful decisions may be continued as long as desired; and while the testing continues, L-counter 34 will count the number of samples of size $n$ that device 30 evaluates, and S-counter 40 will count the number of correct decisions.

It thus becomes a very simple matter to determine how many times out of every million tries, for example, a "Friend" will be accepted as such by decision device 30, given a "round reliability" equal to the value P to which biased bit generator 8 is set. (It should be noted that "round reliability" is defined as the probability P that an acceptable reply will be received by the decision device in response to any particular interrogation selected at random from those sent to an unknown transponder).

L-counter 34 is set so that it produces an output signal when any preselected number (i.e., a million) is reached. The L-counter output-signal or pulse will be applied to set terminal S of flip-flop 36 thereby setting the flip-flop device and allowing the number of "Accept" or "Yes" decisions that S-counter 40 has counted to be transferred through AND 38 to the display 44. The output pulse from L-counter 34 is applied after a delay in delay device 42, to stop terminal 12 of Biased Bit Generator 8 thereby stopping its operation. This delayed L-counter 34 output pulse is also applied to the reset terminals of the device 30 under test, to S-counter 40, and to flip-flop 36, thereby resetting each of these devices to its initial condition. It should be noted that some devices 30 under test will not require resetting by an external pulse. As soon as display device 44 has displayed or printed the number of successes achieved by decision device 30, it produces an output signal that starts operation of Biased Bit Generator 8 again. Thus, display or printer 44 will provide a record of the number of "Yes" decisions out of any selected number of decisions made by decision device 30, when the binary information ratio (between input 1's and 0's) is equal to P (the value to which Biased Bit Generator 8 is set). This value of P corresponds to the "Round-Reliability" in an IFF decisional environment.

If Biased Bit Generator 8 is set to produce output signals such that any particular output signal selected at random has a probability of, $P = 0.10$, for example, then display 44 will record the number of times out of L tries (where L is the number to which L-counter 34 counts before producing an output pulse) that an enemy might succeed in providing an "Accept" ("Yes") reply if he used certain tactics. A number of other values of P must, of course, be used to determine the full capabilities of any decision device 30 under test. The two values of P discussed above ($P = 0.7$, and $P = 0.1$) have been utilized for illustrative purposes only.

The technique of the present invention can be used in many ways. It can, for example, be used to determine the effectiveness of diverse types of decision-making devices by adding appropriate circuitry to select and limit the samples applied. Clearly the present invention provides a technique for testing decision-making devices of the Yes-No type in a controlled laboratory setting. This technique also allows testing of the decision device with a very large number of trials.

It should be noted that through the technique of the present invention binary information may be applied to the device under test at a rate compatible with efficient utilization of the device. This would allow a large number of test trials in a relatively short time period. In this connection, it should also be noted that with existing electronic technology, a data rate in excess of five mega-bits per second is possible.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the U.S. is:

1. A system for testing, in a desired simulated decision-information environment, yes-no type decision-making devices utilizing binary information as a decisional basis comprising:

means for generating a biased-data information stream of binary 1's and 0's, wherein the ratio of said binary 1's and 0's is adjustable to a desired value and remains constant until readjusted, said binary ratio being related to the decision-information environment desired to be simulated, said means having an output adapted for coupling to the input of said decision device under test; and means adapted for coupling to the output of said decision device for observing the number of "yes" decisions and the total number of "Yes + No" decisions made by said decision device.

2. The testing system of claim 1 wherein said observing means includes counting means for separately counting the number of "Yes" decisions and the total number of "Yes + No" decisions made by said decision device, and means for displaying the counts accumulated in said counting means.

3. The testing system of claim 2 wherein said observing means includes logic means for allowing display of only the total number of "Yes" decisions when a predetermined selected number of "Yes + No" decisions have been made.

4. The testing system of claim 2 wherein said observing means includes means for resetting said binary generating means, said counting means, and said display means.

5. A method of testing, in a desired simulated decision-information environment, yes-no type decision making devices which utilize binary information as a decisional basis comprising the steps of:

setting the ratio of binary 1's to 0's to be applied to said decision-making device under test equal to a desired value;

applying binary information to said decision device, said binary information having controllably variable characteristics related to the particular information environment desired to be simulated, whereby the ratio of binary 1's to 0's is representative of information in a decision-information environment desired to be simulated; and observing the response of said decision device to said applied binary information.

6. The testing method of claim 5 wherein said binary information is applied at a data rate compatible with efficient utilization of said device, whereby a large number of test trials may be accomplished in a relatively short period of time.

7. The testing method of claim 6 wherein said binary information is applied at a rate in excess of 5 megs-bits per second.

8. A system for testing, in a desired decision-information environment, yes-no type decision-making devices utilizing binary information as a decisional basis comprising, in combination:

means for generating a biased-bit information stream of binary 1's and 0's, wherein the ratio of said binary 1's and 0's is adjustable to a desired value and remains constant until readjusted, said binary ratio being related to the decision information environment desired to be simulated;

means coupled to said biased-bit generating means for counting the number of "yes" decisions;

means coupled to said biased-bit generating means for counting the number of "yes" and "no" decisions; and means coupled to both said counting means for displaying the number of "yes" decisions for a predetermined number of "yes" and "no" decisions.

9. A system as in claim 8, including:

means coupled to said biased-bit generating means for starting operation thereof.

10. A system as in claim 8, including:

means coupled to said baised-bit generating means, both said counting means, and said display means for resetting the states of said means in preparation for another counting cycle.

* * * * *